United States Patent [19]

Golden

[11] 4,377,886
[45] Mar. 29, 1983

[54] LINE TENSIONER

[76] Inventor: Steven T. Golden, 822 Teague Dr., Santa Paula, Calif. 93060

[21] Appl. No.: 152,062

[22] Filed: May 20, 1980

[51] Int. Cl.$^3$ .............................................. B65H 77/00
[52] U.S. Cl. .................................. 24/71.1; 24/68 CT; 24/68 CD
[58] Field of Search .............. 24/69 CT, 71 ST, 68 R, 24/68 J, 68 SB, 68 AS, 68 PP, 68 FP, 68 CD, 68 CT, 69 R, 69 ST, 69 CF, 69 WT, 70 ST, 71 CT, 71.1, 71.2, 71.3

[56] References Cited

U.S. PATENT DOCUMENTS

| | | | |
|---|---|---|---|
| 507,454 | 10/1893 | Rogers | 24/71.1 UX |
| 1,982,444 | 11/1934 | Miller | 24/71.2 |
| 2,097,048 | 10/1937 | Statler | 24/71.1 X |
| 2,557,499 | 6/1951 | Davis | 24/68 CD |
| 2,896,283 | 7/1959 | Huber | 24/71.1 |
| 3,866,272 | 2/1975 | Prete et al. | 24/68 CD |
| 3,887,966 | 6/1975 | Gley | 24/71.1 X |

FOREIGN PATENT DOCUMENTS 139731 12/1934 Austria .................. 24/71.1

Primary Examiner—Dennis L. Taylor
Attorney, Agent, or Firm—William W. Glenny

[57] ABSTRACT

A system for tensioning a line of flexible material such as a cord, rope, cable or web, including a body provided with a pair of spaced sheave means each having a central rod around which the line may pass, the axes of the rods being parallel. A bracket projects from the body in a direction perpendicular to the plane of the rod axes, and includes a pivotal attachment point spaced from the plane. A swing arm may be pivotally attached at one end to said point and at its other end to the line to be tensioned, and means are provided for selectively locking said arm against swinging movement when the arm is parallel to the plane of the rod axes.

5 Claims, 12 Drawing Figures

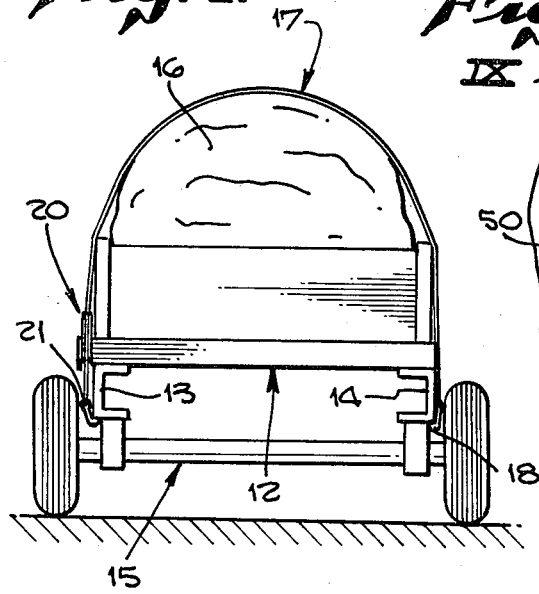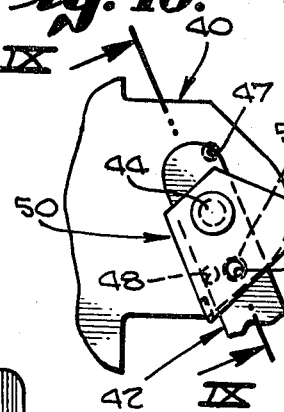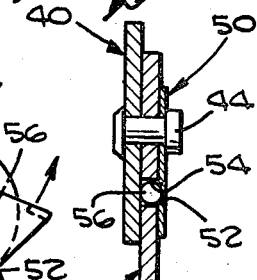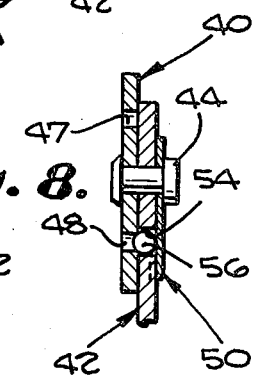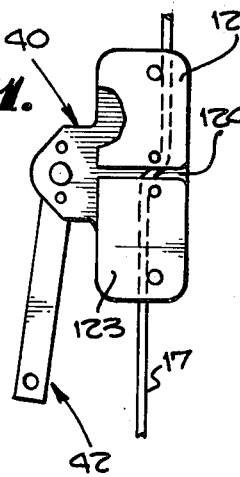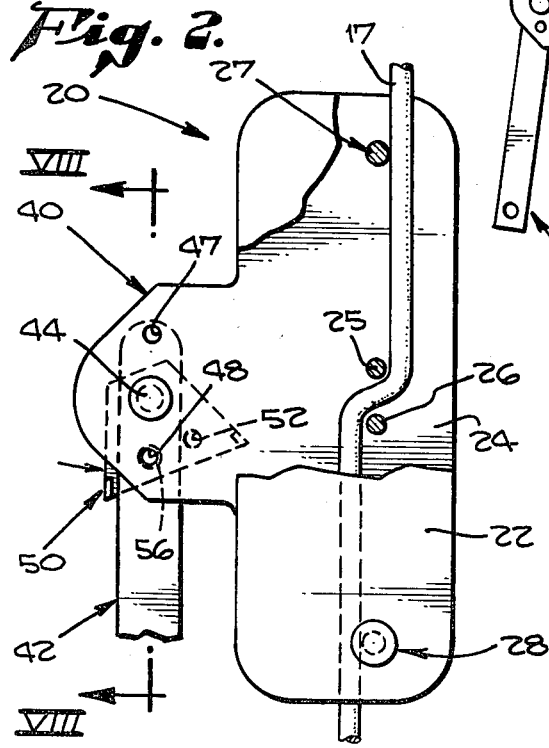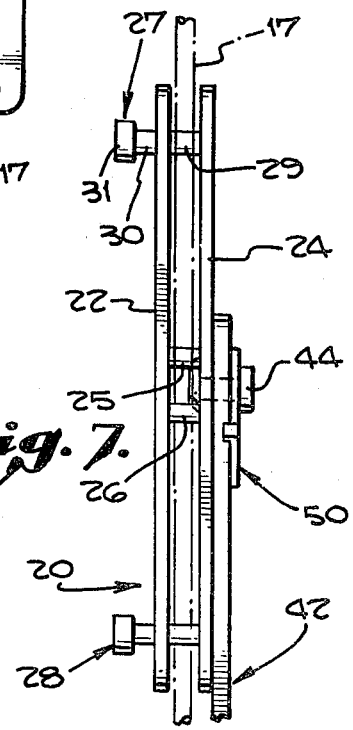

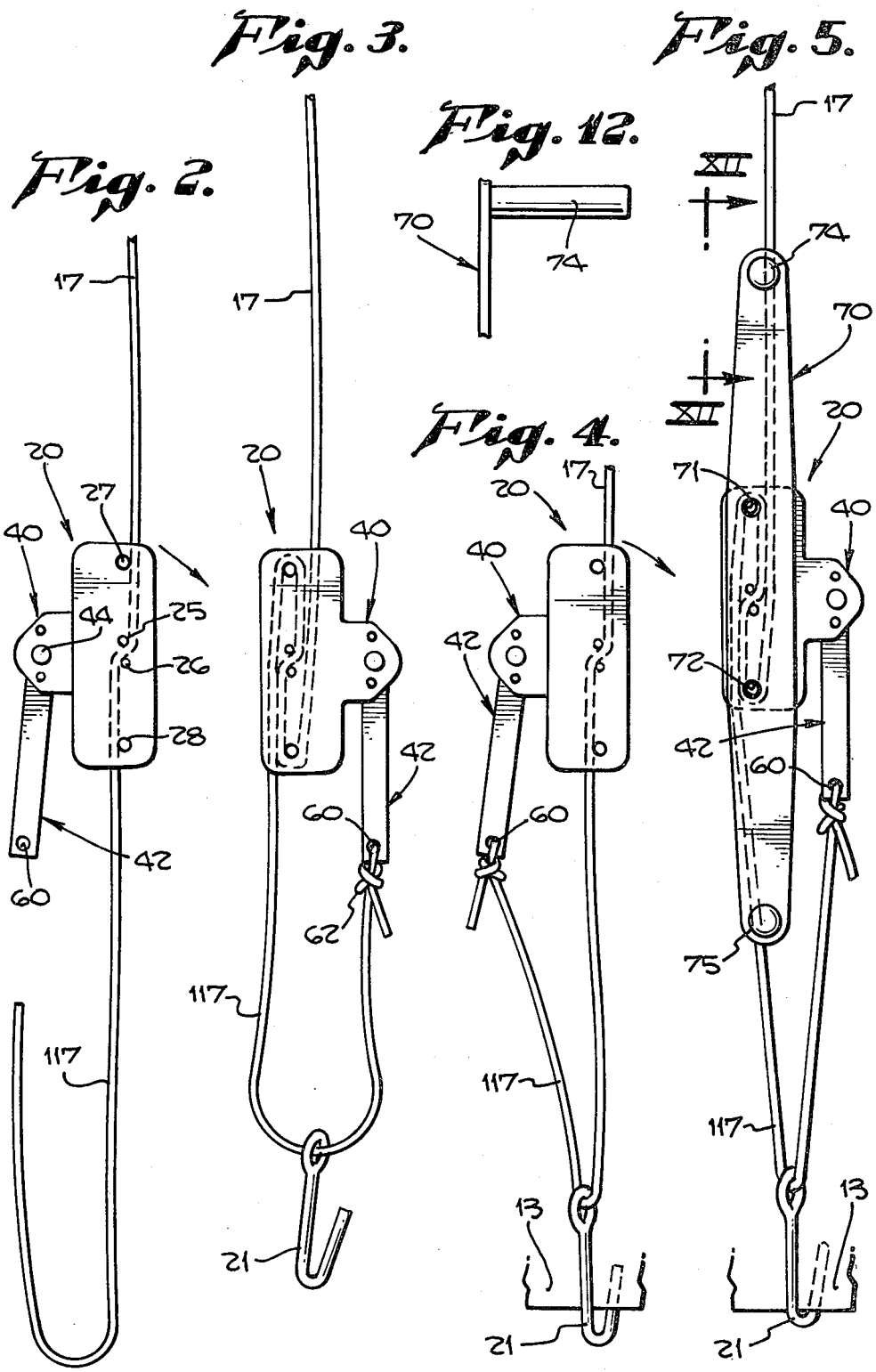

LINE TENSIONER

BACKGROUND AND SUMMARY OF THE INVENTION

The present invention relates generally to devices for producing tension in a line, and more particularly to such a device which is simple, inexpensive and portable and primarily usable in tightening cable, rope, webbing and similar lines in retaining a load in place on a vehicle.

In its preferred form hereinafter described and illustrated, the invention includes a pair of spaced plates of metal or equivalent material, typically generally rectangular in shape and held in spaced parallel relation by a pair of studs, one near each of two opposite ends of the plates, fixed to the plates and extending therebetween. Each of the studs projects beyond one of the plates to provide anchoring points for application of a crank used in applying torque to the tensioner and in removing torque therefrom. One of the plates has fixed thereto a bracket or ear lying in the plane of the plate and extending outwardly from the generally rectangular outline of the plates. A swing arm is pivotally attached to the bracket ear for swinging or pivoting movement in a plane parallel to that of the bracket ear itself, and the distance between the pivotal axis and the line joining the two studs is large compared to the thickness of the line as it is curved partially around the studs in use. The distal end of the swing arm has attached thereto one end of the line, which then passes through an eye of a hook (or alternatively, around a pulley attached to a hook) and then between the plates of the body of the tensioner. The other end of the line is made fast to a distant part of the vehicle carrying the load, and the hook is similarly fastened to the vehicle, with the major length of the line passing over the load. Twisting the tensioner about its own axis then serves to impose tension on the line, and such twisting is accomplished by a crank temporarily attachable to the projecting portions of the studs. When fully tensioned the device is inherently in balanced equilibrium, and will resist any tendency to become loosened by reason of movement or swaying of the load while it is being transported.

BRIEF DESCRIPTION OF THE DRAWINGS

FIG. 1 is an end elevational view of a stylized truck or trailer carrying on its bed a load and showing the line tensioner of the present invention used in the rigging which holds the load in place on the bed.

FIGS. 2, 3, 4 and 5 are front elevational views of the line tensioner showing successive steps in tightening a line.

FIG. 6 is a front elevational view, on an enlarged scale and with part of one plate broken away, of the line tensioner in its FIG. 2 position.

FIG. 7 is a side elevational view of the device as seen in FIG. 5.

FIG. 8 is a fragmentary sectional view taken on line VIII—VIII of FIG. 6, showing the swing arm in locked position.

FIG. 9 is a view similar to FIG. 8 except showing the swing arm in its unlocked position, and taken along the line IX—IX of FIG. 10.

FIG. 10 is a fragmentary view looking leftwardly at FIG. 9.

FIG. 11 is an elevational view of an alternative form of the line tensioner in which the front plate is divided into a pair of smaller plates by a transverse slot to facilitate attaching the line tensioner to a line.

FIG. 12 is a fragmentary view taken on arrows XII—XII of FIG. 5 showing a typical handle on the crank.

DETAILED DESCRIPTION

With reference to the drawings, FIG. 1 shows a truck body having a bed indicated generally at 12 resting on longitudinal support members 13 and 14 fixed to running gear indicated generally at 15. A load 16 is carried on bed 12, retained in position by a line such as a cord, rope or the like indicated generally at 17 hooked at 18 to support member 14 and including on the other side of the truck a line tensioner of the present invention indicated generally at 20 carried by rope 17, hooked at 21 to the other support member 13 in a manner to be described below.

Use of the present line tensioner will be understood from a subsequent description of the sequence of steps shown in FIGS. 2-5 inclusive, and its construction will first be described in connection with FIGS. 6 and 7. As there shown, tensioner 20 includes a pair of spaced parallel front and rear plates 22, 24 of metal, held in assembled relation as shown by a pair of pins and a pair of studs extending between and fixed to the plates. Thus pins 25, 26 are disposed generally centrally of the area of the plates and spaced from one another by a distance somewhat greater than the diameter of rope 17, so the rope can pass easily between the pins, as seen in FIG. 6. The pair of studs are indicated generally at 27 and 28. Stud 27 includes a rod 29 between the plates, and a shank 30 projecting forwardly from the front plate 22, terminating in an enlarged head 31. Stud 28 is identical to stud 27.

Rear plate 24 has fixed thereto and preferably formed integrally therewith an enlarged ear or bracket indicated generally at 40, and a swing arm indicated generally at 42 is pivotally attached to the bracket by pin 44 for pivotal swinging about the axis of pin 44 in a plane parallel to the common plane of plate 24 and bracket ear 40.

Means are provided for selectively locking arm 42 when its axis is parallel to the line joining studs 27 and 28, as in FIG. 6. In the present illustrative form of the invention such means include a pair of openings 47, 48 formed in bracket ear 40, a locking plate indicated generally at 50 pivotally mounted on pin 44 and provided with an opening 52 formed therein, a larger opening 54 formed in swing arm 42, and a spherical ball 56 loosely received in opening 54. All openings just mentioned lie at a common radius from the axis of pin 44, and the diameters of openings 47, 48 and 52 are approximately equal and substantially less than the diameter of ball 56 and thus also of the swing arm opening 54. Thus when the locking plate 50 is moved by the user to its unlocked position seen in FIGS. 9 and 10, ball 56 partially enters opening 52, so arm 42 is free to be swung about the axis of pin 44. When arm 42 is in its position of FIGS. 6, 7 and 8, with its axis parallel to the line joining studs 27 and 28, ball 56 partially enters one of the openings, as 48, formed in the bracket ear 40. The user then swings locking plate 50 through a small angle so that opening 52 therein is out of alignment with openings 48 and 54, and ball 56 is thus retained in its FIG. 8 position, serving as a locking detent to prevent rotation of the swing arm relative to the bracket ear. The locking plate 50 is desirably made of thin somewhat resilient sheet metal so that it is frictionally retained in whatever position the user chooses to place it.

Use of the line tensioner of the present invention will now be described in connection with FIGS. 2-5 inclusive, showing successive steps in tensioning line 17. FIG. 2 shows the tensioner in its unlocked position on line 17, so that the user can adjust the tensioner upwardly or downwardly to a convenient position in terms of height off the ground or other considerations. The user then rotates the tensioner 180° clockwise in the plane of the drawing to the FIG. 2 position, the swing arm also rotating 180° about the axis of pin 44. The user then attaches the hook 21 to the line and takes up enough line through the opening 60 near the distal end of swing arm 42 to position the hook 21 at approximately its proper position to be attached to whatever anchoring points is selected. The user then ties a knot 62, in order to maintain the selected amount of line available. The user then rotates the tensioner 180° counterclockwise in the plane of the drawing to its FIG. 4 position, with hook 21 engaging its anchoring point 13.

The actual tensioning step then follows, rotating the tensioner 180° clockwise to its FIG. 5 position. This may be accomplished by use of a spanner crank indicated generally at 70 having openings 71, 72 for engaging with studs 27 and 28 and provided with cylindrical handles 74 and 75 projecting from the crank near its outer ends. The user then locks the swing arm in position as described in connection with FIGS. 6, 8, 9 and 10, and the crank is removed.

It will be noted that the amount of slack taken up in rotating the tensioner from its FIG. 4 to its FIG. 5 position is approximately twice the distance between studs 27 and 28. It will be especially noted that the tension in line 117 transmitted to swing arm 42 is exerted through a lever arm of substantial length to provide clockwise torque to the body of the tensioner, as compared to the much smaller counterclockwise torque acting on the tensioner due to the tension urging the upper rope segment 17 upwardly. The tensioner is accordingly inherently stable when in its position seen in FIG. 5, and will resist loosening even during the inevitable strains resulting from bouncing and swaying of the load during transport.

The initial resistance to counterclockwise rotation is independent of the fact that swing arm 42 is rigid, and thus the swing arm could be eliminated and the end of line 117 could be fastened direct to the pivot point of bracket ear 40. However, when swing arm 42 is locked in its position seen in FIG. 5, any tendency of the tensioner to rotate counterclockwise would be resisted initially by the same clockwise torque as if the swing arm had been eliminated, but that clockwise torque would be very substantially augmented after the tensioner was rotated counterclockwise through a portion of a revolution. It will be seen that, after such partial rotation, the swing arm would project angularly rightwardly as seen in FIG. 5, thus substantially increasing the length of the layer arm through which the force in line 117 acts to produce clockwise torque tending to restore the tensioner to its equilibrium position of FIG. 5. Furthermore, the mechanical advantage of 2:1 resulting from the passage of line 117 thorugh the eye of hook 21 serves to double the effect just discussed.

A modified form of tensioner is shown in FIG. 11 in which the front plate 22 of the FIG. 6 tensioner is replaced by a pair of front plates 122 and 123 separated by a slot 124. The slot has a width larger than the diameter of the rope, to facilitate loading the rope in the tensioner. In effect each of the plates 122 and 123 forms one flange of a sheave, the other sheave face being the portion of plate 24 immediately surrounding rod 29 and the corresponding rod of stud 28 respectively. As will be readily understood, the form of the invention first described in connection with FIG. 2 also provides a pair of sheaves for the portions of the line being coiled partially around each of the rods during tensioning of the line in rotating the present device from its position in FIG. 4 to that of FIG 5.

Pins 25 and 26, though not necessary in all forms of the invention, are nevertheless desirable in order to add strength to the tensioner, and to keep the tensioner loosely attached to the line when in its untensioned position as shown in FIG. 2.

Modifications from the illustrated forms of the invention not departing from the spirit of the invention are intended to be embraced within the scope of the appended claims.

I claim:

1. A tensioning device for a flexible tension member such as a line comprising:
    a body including a pair of sheave means, each comprising a rod and flange means, the rods being parallel to one another and spaced to permit a line to pass therebetween, and the flange means being spaced from the body; and
    a bracket carried by the body and projecting therefrom in a direction generally perpendicular to the plane containing the axes of said rods, including means forming a pivotal attachment point for tension means, said point being spaced from the plane and the pivotal axis being parallel to the rod axes.

2. The invention as defined in claim 1 wherein said tension menas comprises a rigid swing arm having one end pivotally connected to said attachment point and its other end adapted to be attached to one end of said line, the intermediate portion of said line passing through a slippable connection to an anchoring point.

3. The invention as defined in claim 2 including selectively operable means for locking said swing arm when it is parallel to an imaginary line between said rod axes.

4. The invention as defined in claim 3 including spaced stud means fixed to said body and projecting therefrom for facilitating attachment to the body of crank means for cranking said body about an axis parallel to the axes of said rods.

5. The invention as defined in claim 1 wherein said tension means includes the end portion of said line, the intermediate portion of said line passing through a slippable connection to an anchoring point.

* * * * *

REEXAMINATION CERTIFICATE (266th)
United States Patent [19]
Golden

[11] B1 4,377,886
[45] Certificate Issued Oct. 23, 1984

[54] LINE TENSIONER

[76] Inventor: Steven T. Golden, 822 Teague Dr., Santa Paula, Calif. 93060

Reexamination Request:
No. 90/000,513, Mar. 22, 1984

Reexamination Certificate for:
Patent No.: 4,377,886
Issued: Mar. 29, 1983
Appl. No.: 152,062
Filed: May 20, 1980

[51] Int. Cl.³ .................................................. B65H 77/00
[52] U.S. Cl. .................................. 24/71.1; 24/68 CT; 24/68 CD
[58] Field of Search ............ 24/69 CT, 71 ST, 68 R, 24/68 J, 68 SB, 68 AS, 68 PP, 68 FP, 68 CD, 68 CT, 69 R, 69 ST, 69 CF, 69 WT, 70 ST, 71 CT, 71.1, 71.2, 71.3

[56] References Cited
U.S. PATENT DOCUMENTS
2,557,499  6/1951  Davis ........................... 24/68 CD

*Primary Examiner*—Dennis L. Taylor

[57] ABSTRACT

A system for tensioning a line of flexible material such as a cord, rope, cable or web, including a body provided with a pair of spaced sheave means each having a central rod around which the line may pass, the axes of the rods being parallel. A bracket projects from the body in a direction perpendicular to the plane of the rod axes, and includes a pivotal attachment point spaced from the plane. A swing arm may be pivotally attached at one end to said point and at its other end to the line to be tensioned, and means are provided for selectively locking said arm against swinging movement when the arm is parallel to the plane of the rod axes.

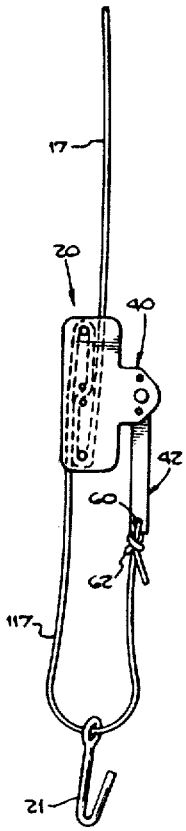

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended:

Claims 2-5, dependent on an amended claim, are determined to be patentable.

1. A tensioning device for a flexible tension member such as a line comprising:
   a body including a pair of sheave means, each [comprising] *having* a rod and flange means, the rods being parallel to one another and spaced to permit a line to pass therebetween[, and the flange means being spaced from the body]; and
   a bracket carried by the body and projecting therefrom in a direction generally perpendicular to the plane containing the axes of said rods, including means forming a pivotal attachment point for tension means, said point being spaced from the plane and the pivotal axis being parallel to the rod axes[.],
   *the body being adapted to be rotated approximately 180° about an axis parallel to said rod axes between loose and tensioned conditions of the line, the line when in loose condition passing between said rods generally rectilinearly and when tensioned forming a figure 8 configuration around said rods, whereby the effective length of the line is shortened by at least twice the distance between said rods between loose and tensioned conditions.*

* * * * *